United States Patent
Shangle et al.

(10) Patent No.: US 10,794,412 B2
(45) Date of Patent: Oct. 6, 2020

(54) ADJUSTABLE DECKING ASSEMBLY

(71) Applicant: Kinedyne LLC, Branchburg, NJ (US)

(72) Inventors: Chann A. Shangle, Millbrook, AL (US); Jason S. Lueck, Prattville, AL (US); Todd A. Jenkins, Montgomery, AL (US)

(73) Assignee: KINEDYNE LLC, Branchburg, NJ (US)

( * ) Notice: Subject to any disclaimer, the term of this patent is extended or adjusted under 35 U.S.C. 154(b) by 0 days.

(21) Appl. No.: 16/260,540

(22) Filed: Jan. 29, 2019

(65) Prior Publication Data
US 2019/0234442 A1 Aug. 1, 2019

Related U.S. Application Data

(60) Provisional application No. 62/623,747, filed on Jan. 30, 2018.

(51) Int. Cl.
| | |
|---|---|
| *F16B 7/04* | (2006.01) |
| *B65G 1/10* | (2006.01) |
| *F16B 2/18* | (2006.01) |
| *B60P 1/02* | (2006.01) |
| *B62D 33/02* | (2006.01) |
| *B60P 7/15* | (2006.01) |

(52) U.S. Cl.
CPC .............. *F16B 7/0446* (2013.01); *B60P 1/02* (2013.01); *B62D 33/0222* (2013.01); *B65G 1/10* (2013.01); *F16B 2/185* (2013.01); *B60P 7/15* (2013.01)

(58) Field of Classification Search
CPC .... F16B 7/0446; F16B 2/185; B62D 33/0222; B60P 1/02; B60P 7/15; B65G 1/10
See application file for complete search history.

(56) References Cited

U.S. PATENT DOCUMENTS

| | | | |
|---|---|---|---|
| 2,513,348 A | 1/1944 | Nampa | |
| 2,575,751 A | 12/1948 | Donnelley | |
| 2,980,037 A * | 4/1961 | Elsner | B60P 7/0815 |
| | | | 410/144 |

(Continued)

FOREIGN PATENT DOCUMENTS

| | | |
|---|---|---|
| DE | 197 06 493 A1 | 8/1998 |
| DE | 201 01 838 U1 | 9/2001 |

(Continued)

OTHER PUBLICATIONS

International Search Report and Written Opinion for PCT/US2019/015536, dated May 3, 2019, 12 pp.

*Primary Examiner* — Ko H Chan
(74) *Attorney, Agent, or Firm* — Brinks Gilson & Lione

(57) ABSTRACT

An adjustable decking assembly comprising a track, a channel unit pivotably connected with a bracket, the bracket slidably mounted upon the track, a lock pivotably mounted on the bracket and movable between a locked position and a released position, a spring disposed between the lock and the bracket and biasing the lock toward the locked position, and a lever pivotably mounted on the bracket, wherein the lever pivots to contact the lock and transfer a force upon the lock via a first end of the lever to pivot the lock from the locked position toward the released position when the channel unit is pivoted from a horizontal position to an acute angle below the horizontal position.

24 Claims, 11 Drawing Sheets

(56) References Cited

U.S. PATENT DOCUMENTS

| | | | |
|---|---|---|---|
| 3,114,336 A | 12/1963 | Schroeder et al. | |
| 3,493,263 A | 2/1970 | Brown | |
| 3,575,456 A | 4/1971 | Austin | |
| 4,091,745 A * | 5/1978 | Patch | B60P 7/15 410/146 |
| 5,338,137 A * | 8/1994 | Jensen | B60P 7/06 211/187 |
| 6,074,143 A * | 6/2000 | Langston | B60P 1/00 410/143 |
| 6,315,346 B1 | 11/2001 | Martin | |
| 6,702,533 B1 | 3/2004 | Williams et al. | |
| 6,739,811 B1 * | 5/2004 | Petelka | B60P 1/00 410/143 |
| 7,134,820 B2 | 11/2006 | Ehrlich | |
| 8,172,494 B1 | 5/2012 | Knox | |
| 8,297,896 B2 | 10/2012 | Draisbach | |
| 8,388,287 B2 | 3/2013 | Arnold et al. | |
| 8,757,944 B2 * | 6/2014 | Calico | B60P 1/00 410/143 |
| 8,979,451 B2 | 3/2015 | Downing | |
| 9,090,191 B2 | 7/2015 | Squyres | |
| 9,090,192 B2 | 7/2015 | Squyres | |
| 9,199,572 B2 | 12/2015 | Squyres | |
| 9,505,337 B1 | 11/2016 | Squyres | |
| 9,566,895 B2 | 2/2017 | Knox | |
| 2011/0142564 A1 | 6/2011 | Kaburick | |
| 2013/0266393 A1 | 10/2013 | Calico | |
| 2014/0369781 A1 | 12/2014 | Reid | |
| 2015/0110568 A1 | 4/2015 | Squyres | |
| 2015/0110570 A1 | 4/2015 | Squyres | |
| 2015/0377268 A1 | 12/2015 | Knox | |
| 2016/0082875 A1 | 3/2016 | Squyres | |
| 2016/0114717 A1 | 4/2016 | Squyres | |
| 2018/0050630 A1 | 2/2018 | Kauffman et al. | |

FOREIGN PATENT DOCUMENTS

| | | |
|---|---|---|
| EP | 0 698 545 A1 | 9/1994 |
| EP | 1 857 323 B1 | 5/2007 |
| GB | 2 228 453 A | 8/1990 |

* cited by examiner

ADJUSTABLE DECKING ASSEMBLY

CROSS-REFERENCE TO RELATED APPLICATIONS

This application claims priority from U.S. Provisional Application No. 62/623,747, filed Jan. 30, 2018, the entirety of which is hereby fully incorporated by reference herein.

TECHNICAL FIELD

The subject specification relates to adjustable decking systems for carrying cargo. More specifically, it relates to a height adjustable decking system that can be easily adjusted by a single user at one end of the system.

BRIEF SUMMARY

A first representative embodiment of the disclosure is provided. The embodiment includes an adjustable decking assembly. The assembly includes a track configured to be vertically mounted and defining a plurality of spaced recesses along a length thereof; a channel unit pivotably connected with a bracket, the bracket slidably mounted upon the track; a lock pivotably mounted on the bracket and comprising a finger extending therefrom configured to be removably received within one of the plurality of spaced recesses along the track, wherein the lock is movable between a locked position in which the finger is received within one of the plurality of spaced recesses and a released position in which the finger is released from the recess; a spring disposed between the lock and the bracket and biasing the lock toward the locked position; and a lever pivotably mounted on the bracket, wherein the lever pivots to contact the lock and transfer a force upon the lock via a first end of the lever to pivot the lock from the locked position toward the released position when the channel unit is pivoted from a horizontal position to an acute angle below the horizontal position.

A second representative embodiment of the disclosure is provided. The embodiment includes an adjustable decking system. The system includes a pair of adjustable decking assemblies, wherein each of the pair of adjustable decking assemblies comprising a track configured to be vertically mounted and defining a plurality of spaced recesses along a length thereof, a channel unit pivotably connected with a bracket, the bracket slidably mounted upon the track, a lock pivotably mounted on the bracket and comprising a finger extending therefrom configured to be removably received within one of the plurality of spaced recesses along the track, wherein the lock is movable between a locked position in which the finger is received within one of the plurality of spaced recesses and a released position in which the finger is released from the recess, a spring disposed between the lock and the bracket and biasing the lock toward the locked position, and a lever pivotably mounted on the bracket, wherein the lever pivots to contact the lock and transfer a force upon the lock via a first end of the lever to pivot the lock from the locked position toward the released position when the channel unit is pivoted from a horizontal position to an acute angle below the horizontal position. The system further includes a beam in engagement with and supported between the pair of the adjustable decking assemblies.

A third representative embodiment of the disclosure is provided. The embodiment includes a method of adjusting the representative adjustable decking system described above. The method includes pivoting one of the locks from the locked position to the released position; pulling a first end of the beam associated with the released lock to lower the height of the first end of the beam with respect to the track thereby causing the opposite lock to pivot from the locked position to the released position; causing a second end of the beam associated with the opposite lock to slide down along the respective track until the opposite lock pivots back to the locked position; and repeating the preceding steps until the beam reaches a desired horizontal position.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
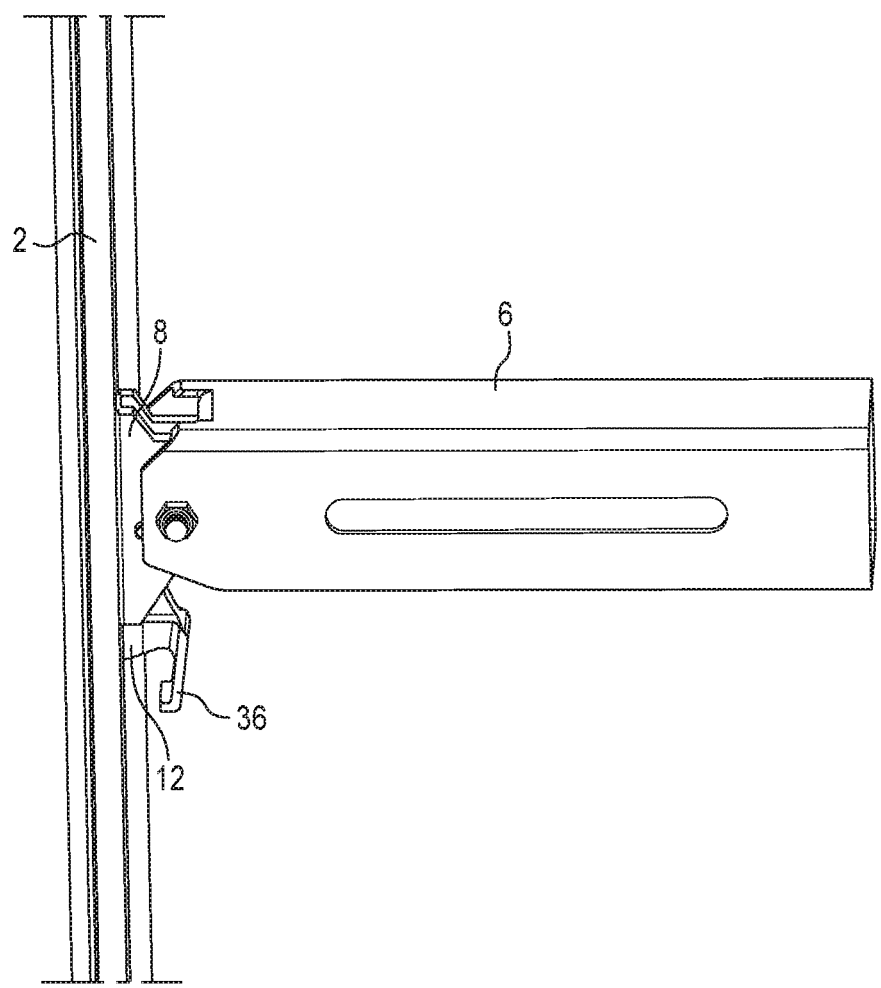
FIG. 1 is a perspective view of an example of an adjustable decking assembly according to the present disclosure in a locked position.
Figure 2:
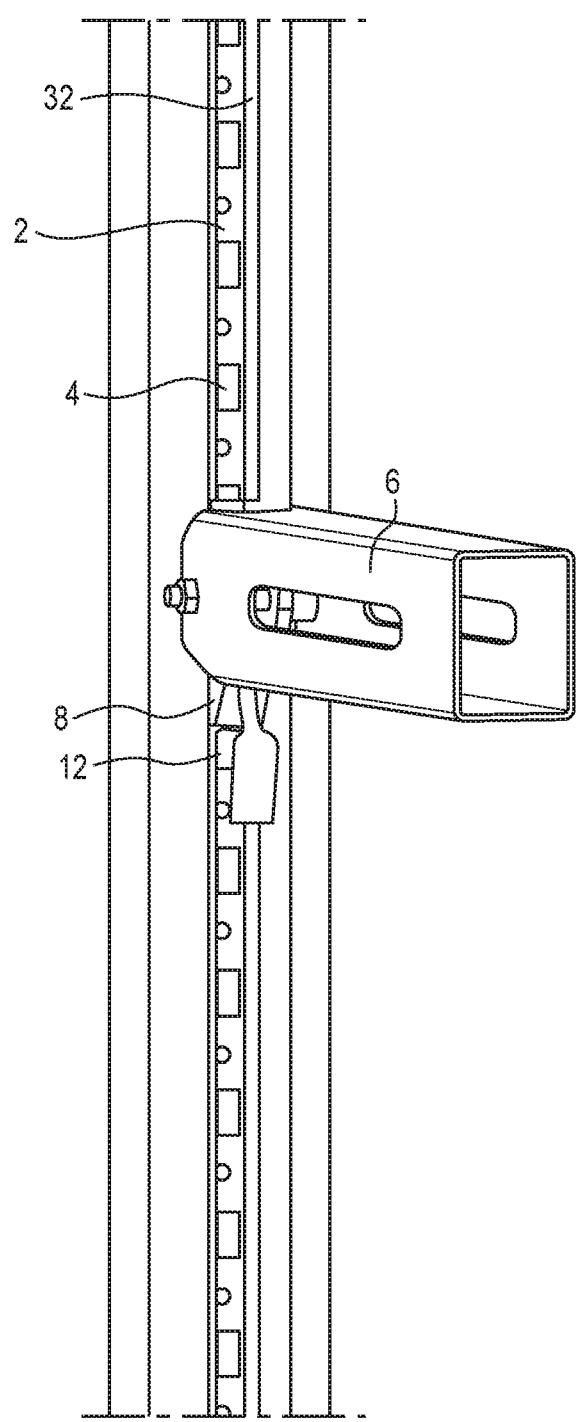
FIG. 2 is another perspective view of FIG. 1 showing the structure of a track according to the present disclosure.
Figure 3:
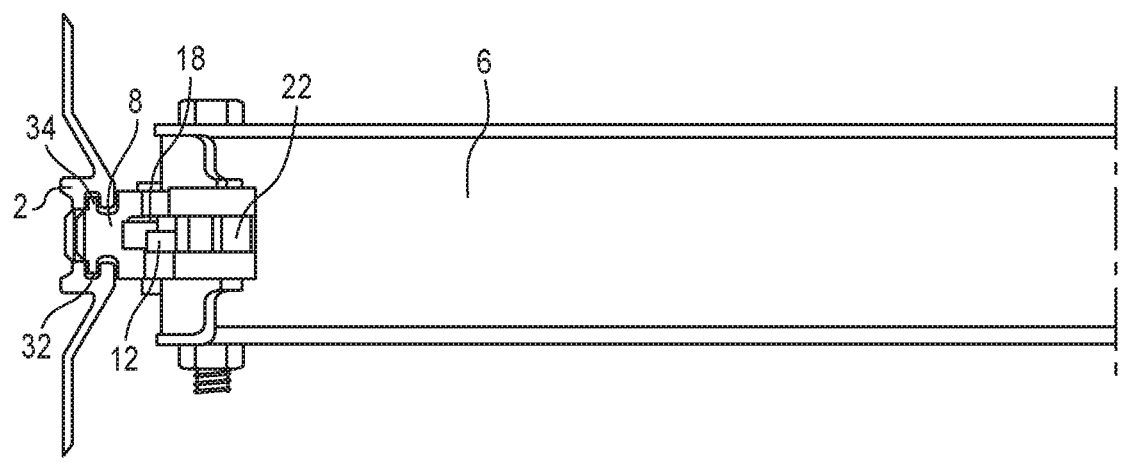
FIG. 3 is a top view of the adjustable decking assembly shown in FIG. 1.

Turning now to FIGS. 1-7, an adjustable decking system 1 is provided. The system 1 includes a pair of adjustable decking assemblies 100 connected by a beam 50 in engagement with and supported between the pair of adjustable decking assemblies 100. The beam 50 has opposite first and second ends 50*a*, 50*b*. Each of the pair of adjustable decking assemblies 100 includes a track 2 configured to be vertically mounted, such as on a wall 101 of a compartment of a vehicle or on a horizontal ground/platform. The track 2 defines a plurality of spaced recesses 4 along its longitudinal length. It is preferable though not necessary to space the recesses 4 consistently and evenly on the track 2. The respective tracks 2 of the adjustable decking assemblies 100 are preferably mounted directly opposite each other such that the spaced recesses 4 on the opposite tracks are aligned at the same height.

Each of the pair of adjustable decking assemblies 100 further includes a channel unit 6 mounted with respect to the opposite ends 50*a*, 50*b* of the beam 50. In some embodiments, the opposite ends 50*a*, 50*b* are slidably mounted to the respective channel unit 6 in a telescoping fashion. In some embodiments, each channel unit 6 includes a slot 6*a* that receives a fastener that extends through the beam, with the position and the length of the slot 6*a* controlling the possible telescoping distance between the respective channel unit 6 and the beam 50.

Figure 4:
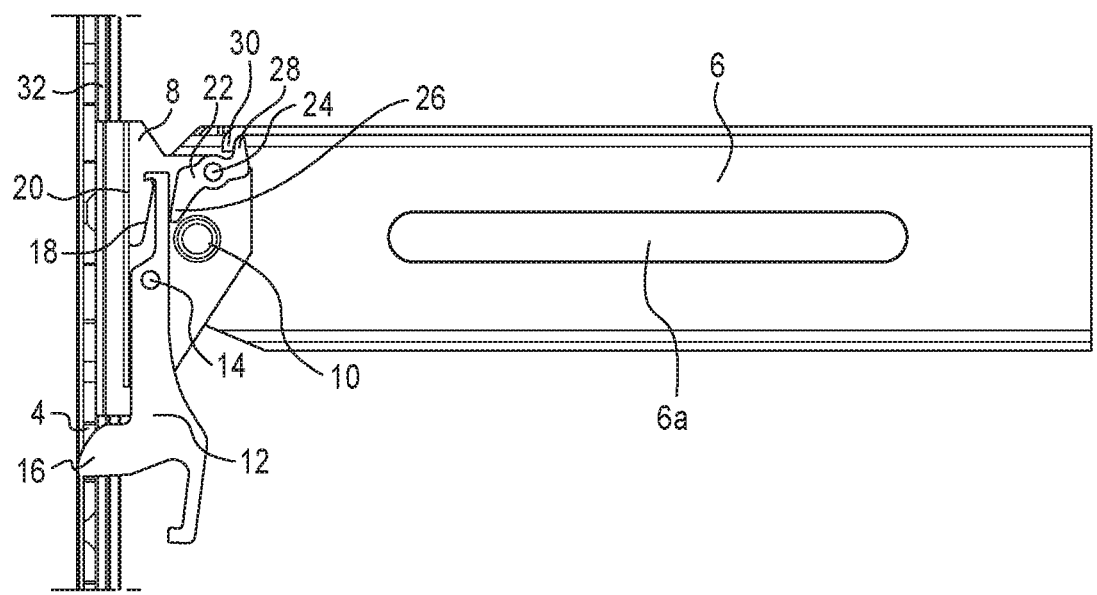
FIG. 4 is a cutaway view of the adjustable decking assembly shown in FIG. 1 in the locked position.
Figure 5:
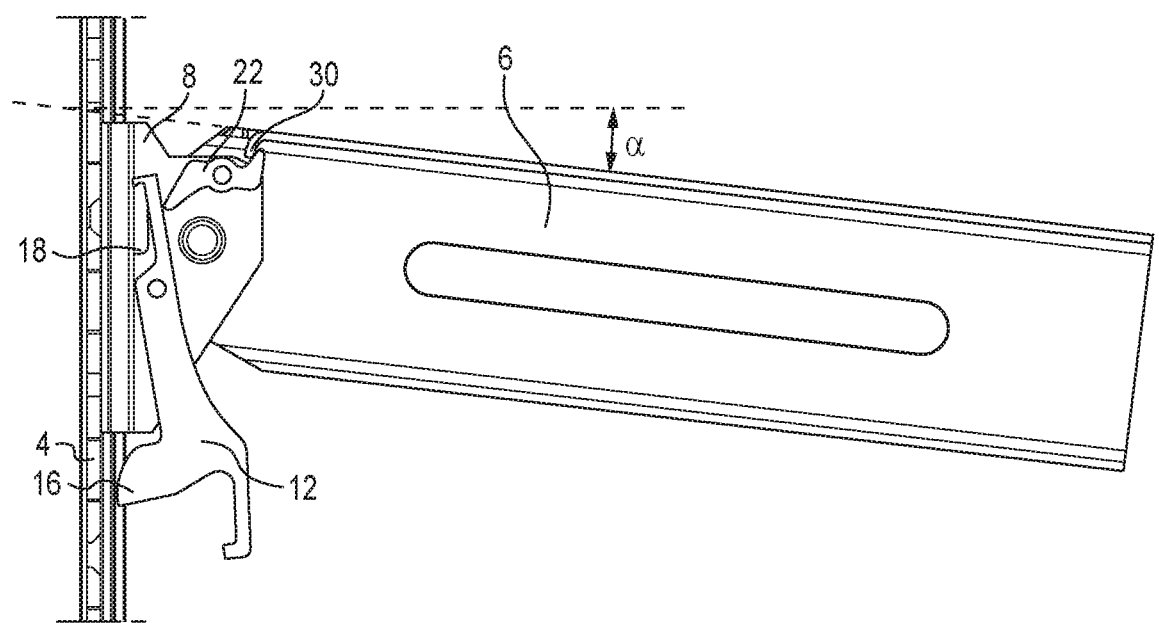
FIG. 5 is a cutaway view of the adjustable decking assembly shown in FIG. 1 in a released position.
Figure 6:
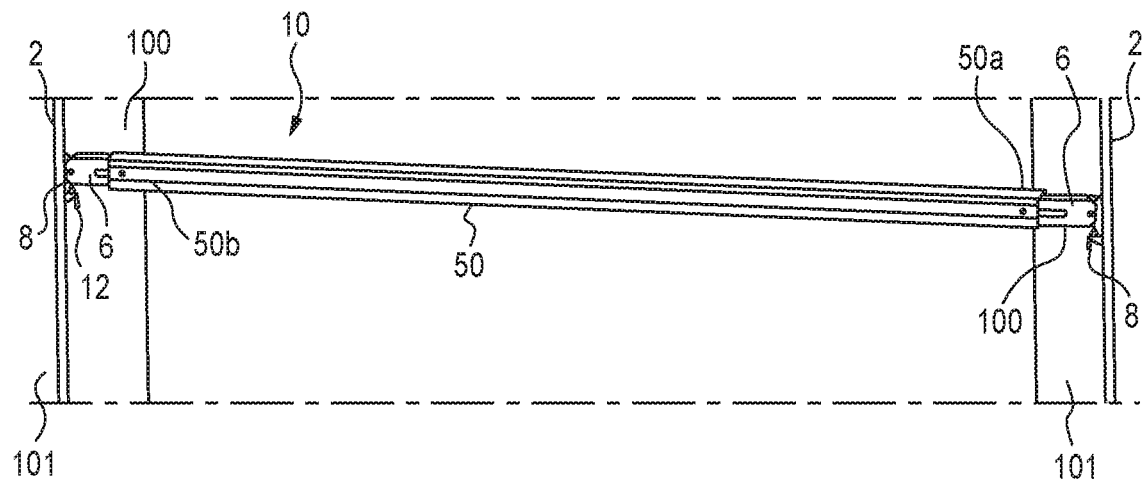
FIG. 6 is a perspective view of the adjustable decking system of FIG. 1 installed within a cargo compartment, with the beam assembly aligned at a horizontal orientation.

Each of the pair of adjustable decking assemblies 100 further includes a bracket 8 that is pivotably connected with the respective to the channel unit 6, such as via a pin 10 that extends through the bracket 8 and through holes in the side walls of the channel unit 6. The bracket 8 includes a shoe that is slidably mounted upon the respective track 2. In some embodiments, the shoe is captured within the track 2 to prevent the shoe from being removed from the track. As can be understood with respect to FIGS. 4 and 5, the rotational position of the bracket 8 is fixed with respect to the track 2, while the bracket 8 is free to slide upward and downward along the track 2 (when the lock 12, discussed below, is disengaged from the track 2). The channel unit 6 can pivot with respect to the bracket 8 as depicted in FIG. 5.

Each of the pair of adjustable decking assemblies 100 further includes a lock 12 pivotably mounted on the respective bracket 8, such as via a pin 14. The lock 12 comprises a finger 16 extending therefrom, which is configured to be removably received within one of the plurality of spaced recesses 4 of the track 2 depending upon the pivotal position of the lock 12 with respect to the bracket 8. The lock 12 is movable between a locked position (FIG. 4) in which the finger 16 is received within one of the plurality of spaced recesses 4 and a released position (FIG. 5) in which the finger 16 is released from the recess. When the lock 12 is in the locked position, the movement of the bracket 8 downward along the track 2 is also locked/restricted and only becomes unlocked/unrestricted once the lock 12 is pivoted to the released position. In some embodiments, the lock 12 includes a handle 36 that is manipulable by the user to allow the user to rotate the lock 12 between the locked position and the release position. In some embodiments, the handle 36 is disposed upon an opposite end portion of the lock 12 from the finger 16, with the pin 14 disposed between the handle 36 and the finger 16 such that these components move in opposite directions as the lock 12 is rotated. In other embodiments such as depicted in FIGS. 4 and 5, the finger 16 and the handle 36 are disposed upon the same side of the pin 14 so that when the handle 36 is pulled away from the track 2 by the user, the finger is withdrawn from a recess 4 in the track 2. A spring 18 may be disposed between the lock 12 and a bearing surface 20 of the bracket 8 to bias the lock 12 toward the locked position (FIG. 4). In some embodiments, the finger 16 is provided with angled surface that cams the lock 12 away from the locked position when the channel unit 6 (or other portion of the assembly 100) is pressed upwardly, such that the beam 50 can be raised upward along the tracks 2 by simply lifting the beam upwardly by the user.

Each of the pair of adjustable decking assemblies 100 further includes a lever 22 pivotably mounted on the bracket 8, such as via a pin 24. The lever 22 includes a first end 26 and a second end 28 with the pin 24 disposed therebetween.

The lever 22 is configured such that, when a force is exerted on the second end 28 of the lever 22 (such as by a lever effectuator 30 formed on the channel unit 6), the first end 26 of lever 22 pivots to contact the lock 12 and exert a force upon the lock 12 to overcome the biasing force from the spring 18 thereby urging the lock 12 to pivot away from the locked position toward the released position. In some embodiments, the first end 26 is in constant contact with the lock 12. In some embodiments, the second end 28 is in constant contact with the lever effectuator 30.

In some embodiments, the track 2 further defines a keyway 32 that extends along the longitudinal length thereof for slidably receiving a key 34 formed on the second end of the bracket 8. In some embodiments, the spring 18 is a leaf spring while in other embodiments a torsion spring, a coil spring, or any other spring mechanism suitable for biasing the lock 12 may be used, such that the spring 18 may "push" the lock 12 to bias it toward the locked position, or alternatively may "pull" the lock toward the locked position. In some embodiments, the lever 22 is Z-shaped. In some embodiments, the lever effectuator 30 is a flange that is integrally or monolithically formed on the channel unit 6, such as by bending a portion of the material forming the channel unit 6 downward into the channel unit's internal volume to establish the flange surface that contacts the second end 28 of the lever 22. In other embodiments, the lever effectuator 30 may be a separate structure that is fixed to the channel unit 6.

Figure 7:
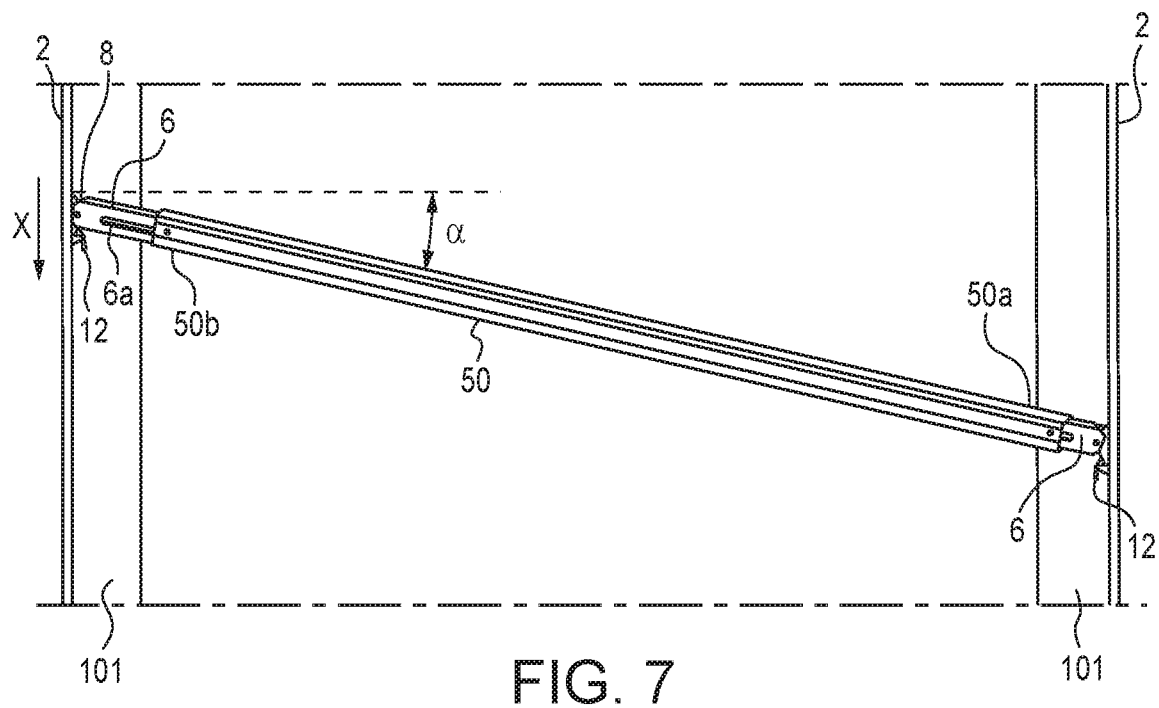
FIG. 7 is the view of FIG. 6, with the beam assembly aligned with one end disposed upon its track at a vertical location below the alignment of the opposite end on its respective track.
Figure 8:
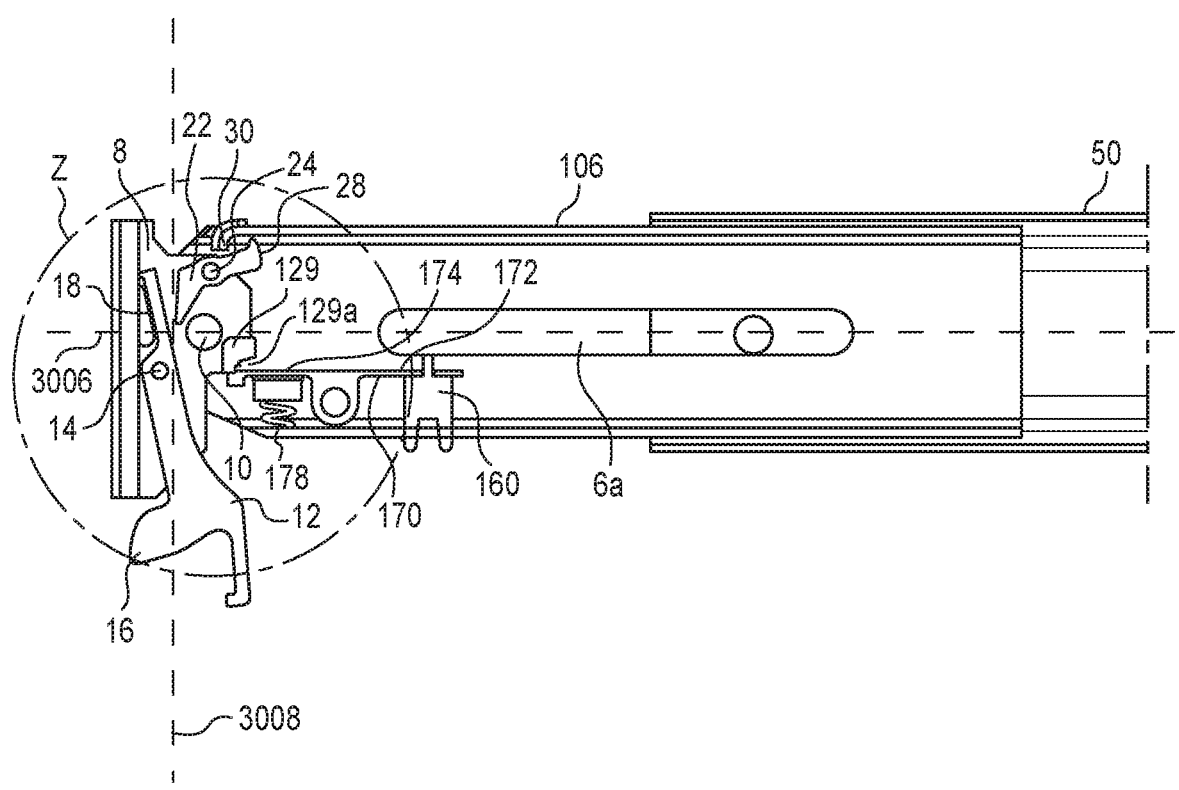
FIG. 8 is a side view of another adjustable decking assembly.

In some embodiments, the assembly 100 is configured such that the finger 16 is completely released from the recess 4 within which it was received when the channel unit 6 is pivoted from a horizontal position (FIG. 4) downward to a position defining an acute angle α relative to the horizontal position (e.g., FIG. 5, FIG. 7). In some embodiments, α is 7° or about 7°. In some embodiments, α may be any angle between about 5° to about 15° inclusive of all angles within this range, while in other embodiments a may be between about 5° to about 30° inclusive of all angles within this range. The term "about" is specifically defined herein to include the reference value as well as a range within plus or minus 5 percent of the reference value.

Referring to FIGS. 4 and 5, a method of adjusting the height of the beam 50 of the adjustable decking system 1 described above is provided. Initially, the user encounters the beam 50 that is disposed at a specific height within the cargo compartment, normally at a constant level height but not required to be at a level height. The user then engages the lock 12 associated with one of the two channel units 6, here referenced as the channel unit 6 that is connected to the first end 50*a* of the beam 50. The user then pivots the lock 12 (e.g., using the handle 36) to withdraw the finger 16 from the recess 4 in the track 2. The user then pulls the first end 50*a* of the beam (and the associated channel unit 6 and bracket 8) downward to lower the height of the first end 50*a* of the beam 50 with respect to the track 2. As the first end 50*a* of the beam is lowered, the opposite end 50*b* of the beam 50 and associated channel unit 6 pivots with respect to the respective bracket 8 as depicted in FIG. 5. As the channel unit 6 connected to the second end 50*b* of the beam 50 pivots with respect to the bracket 8, the second end 28 of the lever 22 is forced to pivot upon its pin 24 by the lever effectuator 30. The pivoting of the lever 22 passes a force from the first end 26 of the lever 22 to the associated lock 12, which presses the lock 12 toward the track 2 against the biasing force of the spring 18. As the lock 12 is rotated, the finger 16 begins to withdraw from the recess 4 in the respective track 2 (because the lever 22 pushes the lock 12 toward the track 2 on an opposite side of the pin 14 from the finger 16, causing the finger 16 to move in the general opposite direction as the force upon the lock 12 from the lever 22).

When the finger 16 is withdrawn from the recess 4 in the track 2, the second end 50b of the beam 50 (and the associated channel unit 6 and bracket 8) falls (arrow X, FIG. 7) along the track 2 due to the force of gravity (and/or due to a downward force in the beam 50 provided by the user that is manipulating the opposite first end 50a of the beam 50). As angle α (FIG. 5) of the second end 50b of the beam 50 (and the respective channel unit 6) relative to a horizontal position decreases, the force upon the lock 12 from the lever 22 decreases, which allows the lock to rotate, as urged by the spring 18, to reinitiate engagement between the finger 16 and the track 2, with the finger extending into a recess 4 when the finger 16 is properly aligned with the recess. The user can continue to lower the first end 50a of the beam 50 with similar motion of the opposite end 50b in an iterative manner as discussed above until the beam 50 has reached the desired height at the first end 50a. At that point the second end 50b of the beam 50 will return to a horizontal position due to gravity, with the finger 16 engaging a respective recess 4 in the track 2.

Accordingly, the method provided herein allows for the height of an adjustable decking system to be lowered to a lower horizontal level with a single user only directly manipulating a single end of the system. In some embodiments, the operator may need to fine tune the height the second end 50b of the beam to ensure that the beam is level, either using the method discussed above, or by locally manipulating the handle 36 of the lock 12 associated with the channel unit 6 connected to the second end 50b of the beam 50 until the beam 50 is horizontal.

Turning now to FIGS. 9-14, another representative embodiment of an adjustable decking assembly 200 is provided. The embodiment includes all of the structure in FIGS. 1-7 unless specifically discussed herein. For the sake of brevity, components that are constructed in the same manner with respect to this embodiment are referenced with the like element numbers as referenced with the previous embodiment.

The adjustable decking assembly 200 includes a channel unit 106, which rotatably supports a bracket 8, similar to the bracket discussed above. The channel unit 106 is provided on both ends of the beam 50. The bracket 8 that is pivotably connected to the channel unit 106 includes the same components and operates in the same manner as discussed above as the bracket 8 discussed above, with any specific differences discussed herein.

Figure 12:
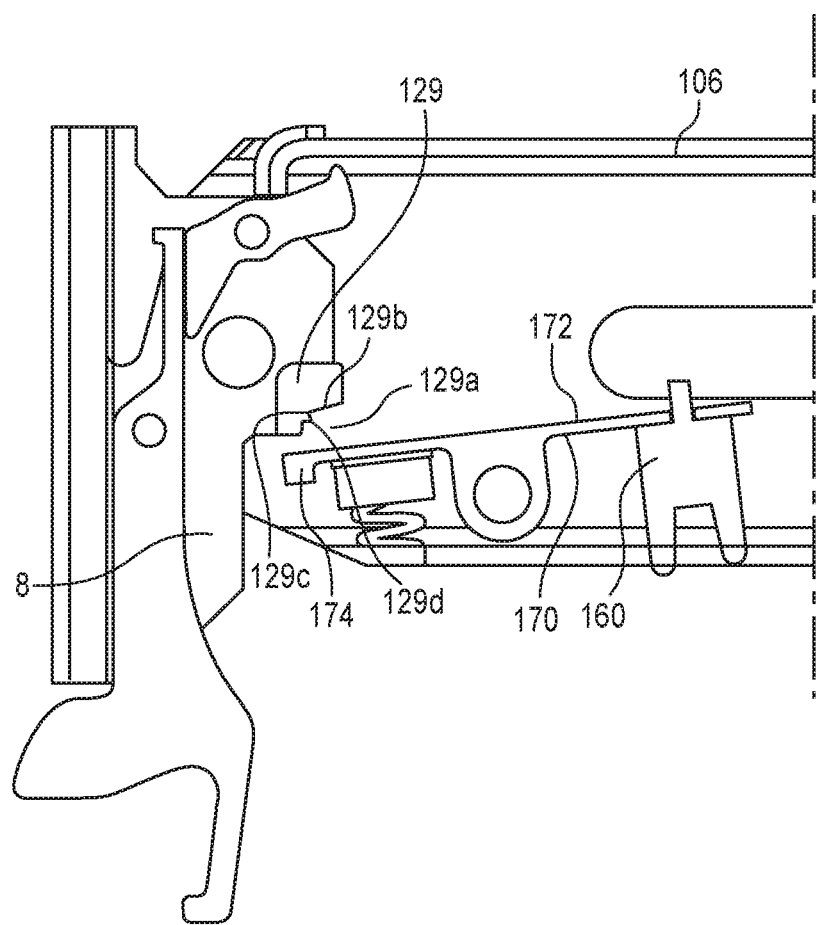
FIG. 12 is a detail view of detail Z of FIG. 8.
Figure 13:
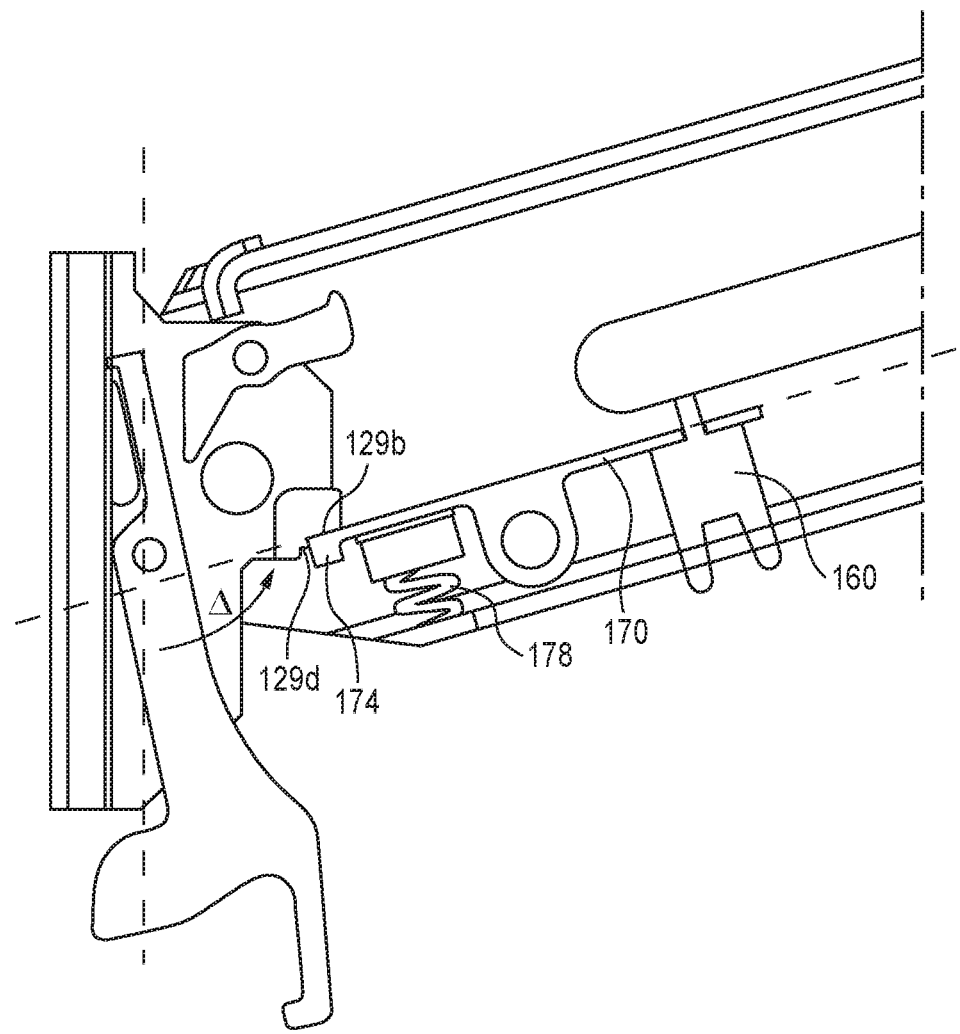
FIG. 13 is a detail view of detail Y of FIG. 9.

The bracket 8 further includes a locking member 129 that is fixed thereto. The locking member 129 includes a pocket 129a (FIGS. 12 and 13). The pocket 129a is defined from an upper wall 129b and a side wall 129c. The upper wall 129b is arranged at an obtuse angle with respect to the side wall 129c, and also to the longitudinal axis 3008 through the bracket 8 (and in some embodiments the track that the bracket 8 slides through).

The pocket 129a is positioned to selectively receive a tip 174 of a locking lever 170, with the tip contacting an upper wall 129b of the locking member, as discussed in detail below. As discussed below, when the tip 174 of the locking lever 150 is disposed within the pocket 129a, and specifically when the locking lever contacts the upper wall 129b, the position of the channel unit 106 is fixed with respect to the bracket 8, and therefore the position of the channel unit 106 is also fixed with respect to the track 2, mounted upon the walls of the cargo compartment. Accordingly, in this orientation, the channel unit 106 and bracket 8 upon the opposite end of the decking beam is also fixed with respect to the opposite track through which that bracket slides, with the opposite bracket 8 disposed above bracket that engages with the tip 174 of the lever, and results in the maximum relative angle of the decking beam (and associated channel units 106) with respect to the longitudinal axis 3008 through the bracket 8, which is normally parallel to the track.

In some embodiments, the locking member 129 may be made from an elastomeric material. In some embodiments, the locking member 129 may include a tooth 129d that extends radially outward from a side wall 129c (opposite from the upper wall 129a). The tooth 129d may be positioned to rest upon the tip portion 174 of the lever when the channel unit 106 is perpendicular to the bracket 8, or substantially perpendicular to the bracket 8, to avoid chatter between the tip portion 174 and the locking member in that position, and may be deformed as the channel unit 106 is rotated upwardly with respect to the bracket 8, which causes similar rotation of the lever 170 (and the tip 174) due to the biasing force of the spring 178. The term "substantially" is specifically defined herein to include all angles plus or minus 3 degrees of perpendicular including exactly perpendicular. As the channel unit 106 continues to be rotated, the tip portion 174 further enters into the pocket 129a until the tip portion 174 contacts the upper wall 129b of the pocket, which prevents further rotation of the channel unit 106 with respect to the bracket 8. In some embodiments, somewhat further motion is available due to the further compression of the spring 178 when the tip 174 contacts the upper wall 129b, but after some further motion further rotation of the channel unit with respect to the bracket 8 is prevented against the spring force 178.

Figure 9:
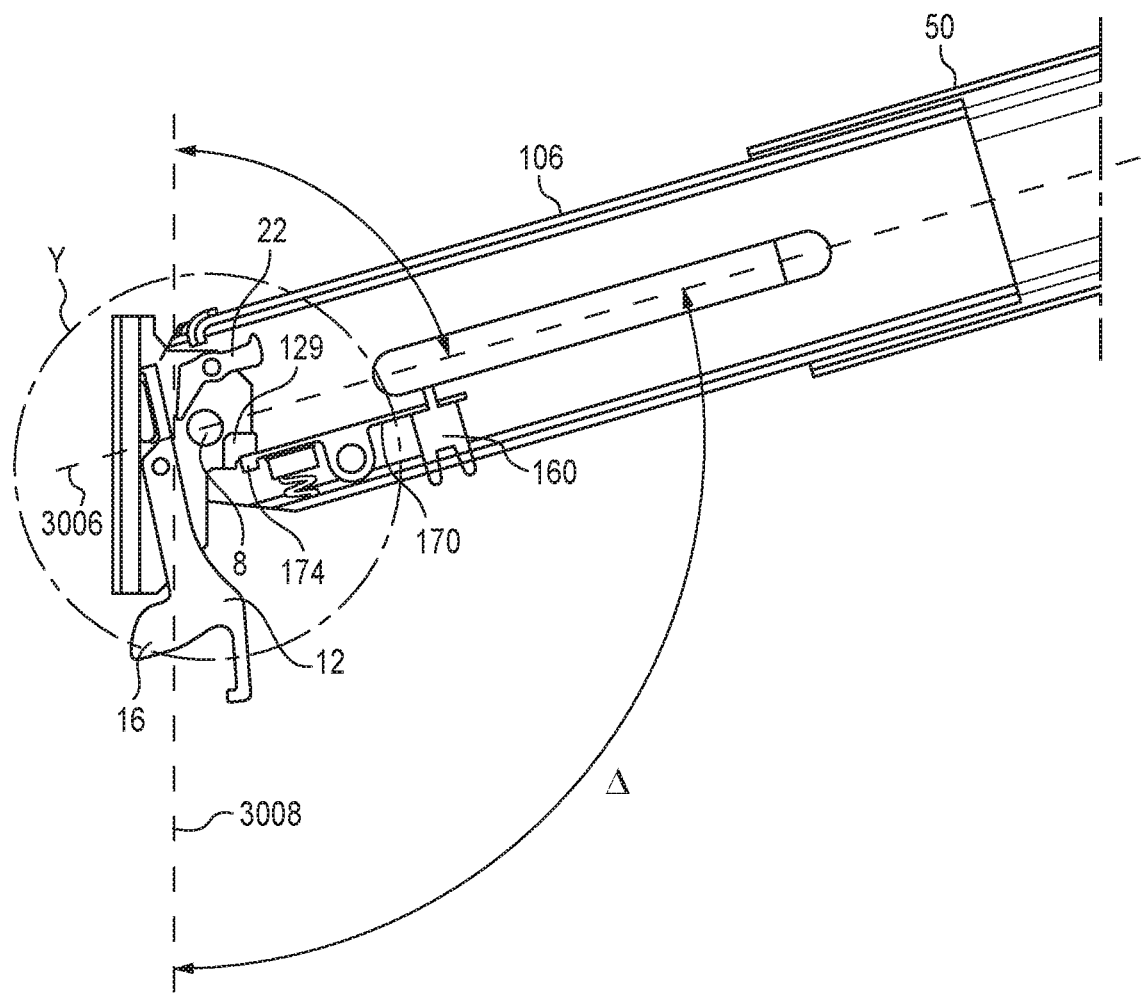
FIG. 9 is the view of FIG. 8 with the channel unit and decking beam rotated with respect to the bracket.
Figure 10:
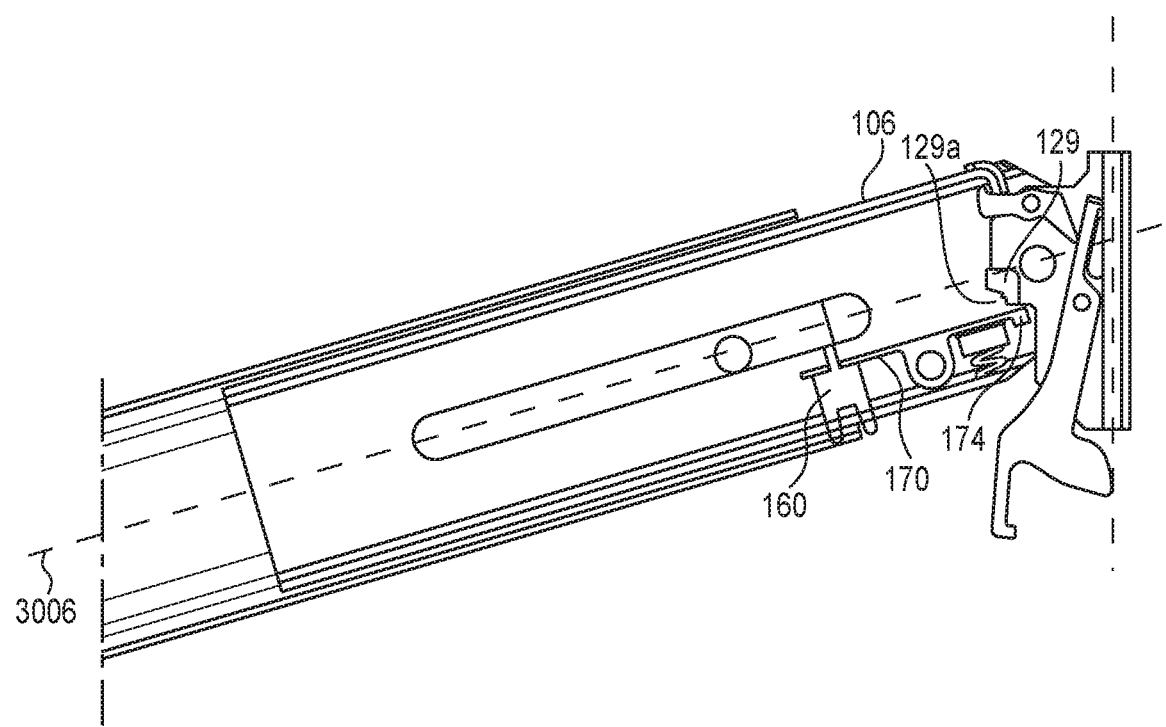
FIG. 10 is a side view of an opposite channel assembly and opposite end of the decking beam when the initial channel unit is positioned as in FIG. 9.

FIG. 9 depicts the channel unit 106 fully rotated with respect to the bracket 8, and the tip 174 of the lever 170 contacting the upper wall 129b of the locking member 129 with an angle Δ disposed between a longitudinal axis 3006 through the channel unit 106 and decking beam 50 (and the opposite channel unit 106) and a longitudinal axis 3008 through the bracket 8 (which is normally parallel to the track through which the bracket 8 slides). In some embodiments the maximum angle Δ may be within a range of about 110 to 130 degrees inclusive of all angles within this range. In other embodiments, the maximum angle may be about 110, 115, 120, 125, 130, 135, or 140 degrees. In embodiments where the spring 178 may be compressed after the tip 174 engages the upper wall 129b of the pocket, the maximum angle may be slightly higher than the nominal values above based upon the possible compression length of the spring. One of ordinary skill in the art with a thorough understanding of this specification would be able to calculate the maximum angle due to possible spring compression (over and above the maximum angle Δ due to the engagement of the tip 174 with the upper wall 129b) based upon the well-known parameters of the chosen spring and therefore without undue experimentation.

Figure 11:
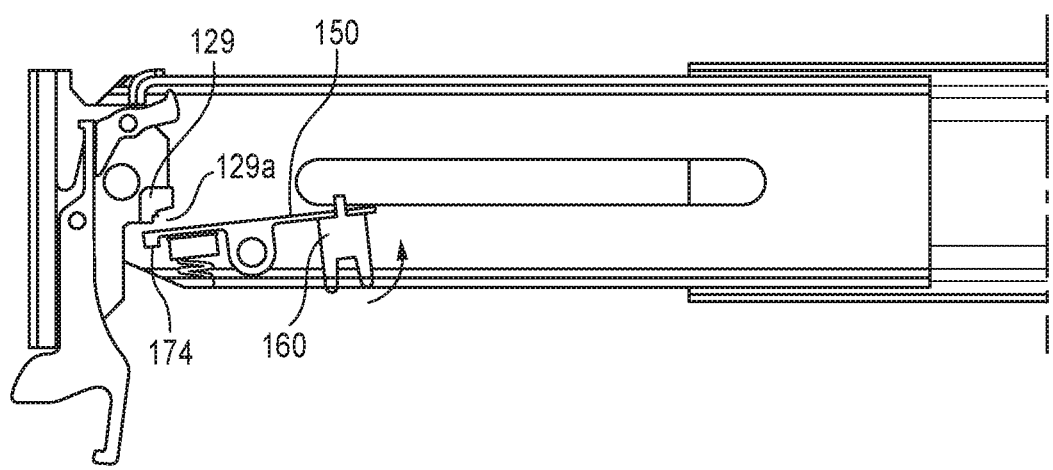
FIG. 11 is the view of FIG. 8 with the button compressed.

The locking lever 170 may be pivotably mounted to the channel unit 106 and extends between a first end portion 174 that is disposed proximate to the bracket 8 (and the locking member 129) and a second end portion 172 that is disposed opposite from the locking member and along the channel unit 106 toward the beam 50. The locking lever 170 may be disposed within the channel unit 106, and may support a button 160, which a portion thereof extends through an aperture in the channel unit 106 such that the button 160 can be manipulated by a user. In some embodiments, the button 160 extends through a hole in the bottom surface of the channel unit 106 so that the user can manipulate the button from below the channel unit 106 (as shown in FIG. 11). In some embodiments, the button 160 is supported upon the second end portion 172 of the locking lever, such that when the button is pushed upward with respect to the channel unit 106, the first end 174 of the locking lever (which is located on the opposite side of the pinned connection from the second end 172) is pushed downward and away from the locking member 129. In embodiments with a tooth 129d, compression of the button 160 urges the tip 174 of the lever downwardly (i.e. away from the upper wall 129b) and with continued compression of the button 160 the tip 174 deforms the tooth 129d to allow the tooth to pass by the tooth 129d and out of the pocket 129a, which allows the channel unit 106 (and therefor the beam 50 and the opposite channel unit 106) to rotate with respect to the bracket 8 toward a configuration wherein the longitudinal axes 3006,3008 are substantially perpendicular to each other. In some embodiments, when the button 160 is pressed, thereby freeing the tip 174 from the upper wall 129b and the pocket 129a, the opposite channel unit 106 and corresponding bracket 8 falls downwardly along its track due to the force of gravity acting on the decking beam 50, channel unit 106 and bracket 8, as discussed above.

In use, the embodiment depicted in FIGS. 9-14 may have functionality when a first end of a captive beam is lowered by a user (using the system of FIGS. 1-7) without interacting with the opposite end of the beam (which remains at a higher level than the end that is lowered by the user). As the beam is lowered the relative angle of the channel 106 with respect to the bracket 8 increases (such that angle Δ becomes obtuse), which with sufficient movement causes the tip 174 of the second lever 170 to enter into the pocket 129a and with sufficient movement contact the upper wall 129b. When the tip 174 contacts the upper wall 129b (and in embodiments compresses the spring 178) the channel unit can no longer rotate with respect to the bracket and therefor the beam is fixed in position until the opposite end of the beam is lowered along its track.

In use and in order to set the beam 50 and associated channel units 106 and brackets 8 (within their respective tracks) at the desired height spanning between the opposite walls (and tracks) the user lowers one end of the beam until the opposite end of the beam is located at the desired height (and may be held at angle due to the system disclosed above and depicted in FIGS. 8-13. When the opposite end of the beam is at the desired height, the user pushes the button 160 on the lower end, which allows that channel unit 106 to rotate with respect to the its bracket 8. Upon pressing the button 160, the user pushes that channel unit 106 (either directly or indirectly by pushing up on the beam 50 proximate to the channel unit 106) until both ends of the beam 50 (and their respective channel units 106 and brackets 8) are positioned at the desired height. The beam 50 is retained at this desired height.

While the preferred embodiments of the present disclosure have been described, it should be understood that the invention is not so limited and modifications may be made without departing from the disclosure. For example, it is contemplated that the adjustable decking system according to the present disclosure may also be used outside vehicle compartments, such as in storage facilities. It is also contemplated that, depending on the purpose of usage, the tracks of the adjustable decking system may be mounted in non-vertical or even horizontal positions. The scope of the disclosure is defined by the appended claims, and all devices that come within the meaning of the claims, either literally or by equivalence, are intended to be embraced therein.

The invention claimed is:

1. An adjustable decking assembly, comprising:
   a track configured to be vertically mounted and defining a plurality of spaced recesses along a length thereof;
   a channel unit pivotably connected with a bracket, the bracket slidably mounted upon the track;
   a lock pivotably mounted on the bracket and comprising a finger extending therefrom configured to be removably received within one of the plurality of spaced recesses along the track, wherein the lock is movable between a locked position in which the finger is received within one of the plurality of spaced recesses and a released position in which the finger is released from the recess;
   a spring disposed between the lock and the bracket and biasing the lock toward the locked position; and
   a lever pivotably mounted on the bracket, wherein the lever pivots to contact the lock and transfer a force upon the lock via a first end of the lever to pivot the lock from the locked position toward the released position when the channel unit is pivoted from a horizontal position to an acute angle below the horizontal position.

2. The adjustable decking assembly of claim 1, wherein the recesses are spaced consistently and evenly along the track.

3. The adjustable decking assembly of claim 1, wherein the track further defines a keyway therealong for slidably receiving a key formed on the bracket.

4. The adjustable decking assembly of claim 1, wherein the spring is disposed between the lock and a bearing surface of the bracket.

5. The adjustable decking assembly of claim 1, wherein the spring is a coil spring, a leaf spring, or a torsion spring.

6. The adjustable decking assembly of claim 1, wherein a lever effectuator is integrally formed on the channel unit.

7. The adjustable decking assembly of claim 6, wherein the lever effectuator is a flange that is integrally or monolithically formed on the channel unit.

8. The adjustable decking assembly of claim 1, wherein the lever is Z-shaped.

9. The adjustable decking assembly of claim 1, wherein the assembly is configured such that the finger is completely released from the recess within which it was received when the channel unit is pivoted from the horizontal position downward to an acute angle α within the range of about 5° to about 15°.

10. The adjustable decking assembly of claim 9, α is about 7°.

11. An adjustable decking system, comprising:
   a pair of adjustable decking assemblies, wherein each of the pair of adjustable decking assemblies comprising a track configured to be vertically mounted and defining a plurality of spaced recesses along a length thereof, a channel unit pivotably connected with a bracket, the bracket slidably mounted upon the track, a lock pivotably mounted on the bracket and comprising a finger extending therefrom configured to be removably received within one of the plurality of spaced recesses along the track, wherein the lock is movable between a locked position in which the finger is received within one of the plurality of spaced recesses and a released position in which the finger is released from the recess, a spring disposed between the lock and the bracket and biasing the lock toward the locked position, and a lever pivotably mounted on the bracket, wherein the lever pivots to contact the lock and transfer a force upon the lock via a first end of the lever to pivot the lock from the locked position toward the released position when the channel unit is pivoted from a horizontal position to an acute angle below the horizontal position; and a beam in engagement with and supported between the pair of the adjustable decking assemblies.

12. A method of adjusting the adjustable decking system of claim 11, comprising:

pivoting one of the locks from the locked position to the released position;

pulling a first end of the beam associated with the released lock to lower the height of the first end of the beam with respect to the track thereby causing the opposite lock to pivot from the locked position to the released position;

causing a second end of the beam associated with the opposite lock to slide down along the respective track until the opposite lock pivots back to the locked position; and repeating the preceding steps until the beam reaches a desired horizontal position.

13. The adjustable decking assembly of claim 1, further comprising a second lever pivotably mounted on the bracket, the second lever includes a first end on a first side of a pivot point and a second end on an opposite side of the pivot point from the first end, wherein the first end of the second lever is biased to contact the bracket, and when the first end of the second lever contacts the bracket relative rotation between the channel unit and the bracket is prevented from obtaining an angle, as measured below the bracket, between a first longitudinal axis through the channel unit and a second longitudinal axis through the bracket with respect to the bracket that is greater than a specific obtuse angle.

14. The adjustable decking assembly of claim 13, wherein the angle is within a range of about 110 to 130 degrees.

15. The adjustable decking assembly of claim 14, wherein the angle is 120 degrees.

16. The adjustable decking assembly of claim 13, wherein the second side of the second lever supports a button, wherein when the button is pressed, the first end of the second lever rotates out of contact with the bracket, thereby allowing channel unit to rotate with respect to the bracket toward a relative position between the channel unit and the bracket where the angle is perpendicular therebetween.

17. The adjustable decking beam assembly of claim 16, wherein the first side of the second lever is biased toward contact with the bracket and pressing the button causes the second lever to rotate against the biasing force upon the second lever.

18. The adjustable decking beam assembly of claim 13, wherein the bracket defines a pocket, wherein a tip portion of the second lever is received within the pocket when the channel unit is rotated with respect to the bracket to a position where the angle is obtuse.

19. The adjustable decking beam assembly of claim 18, wherein the tip portion of the second lever is not disposed within the pocket when the angle is substantially perpendicular.

20. The adjustable decking beam assembly of claim 18, wherein the tip portion of the second lever is not disposed within the pocket when the angle is perpendicular.

21. The adjustable decking beam assembly of claim 18, wherein the tip portion of the second lever is disposed within the pocket when the angle is an obtuse angle.

22. The adjustable decking beam assembly of claim 18, wherein the pocket comprises an upper wall that extends at a second obtuse angle with respect to the longitudinal axis through the bracket, wherein when the tip portion of the second end of the second lever contacts the upper wall, the channel is prevented from further upward rotation with respect to the bracket.

23. The adjustable decking beam of claim 18, wherein the pocket is defined from an elastomeric material.

24. The adjustable decking beam of claim 18, wherein the pocket includes a tooth that extends from a side wall defining the tooth, wherein the tip portion of the second end of the second lever deforms the tooth to allow the tip portion to enter into the pocket as the channel is rotated upwardly with respect to the bracket, the second side of the second lever supports a button, wherein when the button is pressed, the first end of the second lever rotates out of contact with the bracket, thereby allowing channel unit to rotate with respect to the bracket toward a relative position between the channel unit and the bracket where the angle is perpendicular therebetween, wherein when the button is pressed, the tip portion of the second end moves the tooth to allow the tip portion to clear away from the pocket to allow the channel unit to rotate with respect to the bracket toward the perpendicular relative position therebetween.

\* \* \* \* \*